(12) United States Patent  (10) Patent No.: US 8,267,431 B2
Okuno et al.  (45) Date of Patent: Sep. 18, 2012

(54) CONNECTOR

(75) Inventors: Yoshinori Okuno, Kariya (JP); Jun Kondo, Nagoya (JP)

(73) Assignee: Denso Corporation, Kariya (JP)

( * ) Notice: Subject to any disclaimer, the term of this patent is extended or adjusted under 35 U.S.C. 154(b) by 284 days.

(21) Appl. No.: 12/750,117

(22) Filed: Mar. 30, 2010

(65) Prior Publication Data

US 2010/0244433 A1 Sep. 30, 2010

(30) Foreign Application Priority Data

Mar. 31, 2009 (JP) .................................. 2009-85941

(51) Int. Cl.
*F16J 15/00* (2006.01)
(52) U.S. Cl. ........... 285/86; 285/242; 285/314; 285/322
(58) Field of Classification Search .................. 285/1, 2, 285/314, 315, 316, 81, 84, 85, 86, 242, 319, 285/322, 323, 324
See application file for complete search history.

(56) References Cited

U.S. PATENT DOCUMENTS

| | | | |
|---|---|---|---|
| 3,394,950 A * | 7/1968 | Jensen | 285/35 |
| 4,895,570 A * | 1/1990 | Larkin | 604/411 |
| 6,892,706 B2 | 5/2005 | Kienzler et al. | |
| 2009/0035055 A1 * | 2/2009 | Rosch et al. | 403/314 |

FOREIGN PATENT DOCUMENTS

EP          1394402          3/2004

OTHER PUBLICATIONS

U.S. Appl. No. 12/750,150 of Okuno et al., filed Mar. 30, 2010.
U.S. Appl. No. 12/750,087 of Okuno et al., filed Mar. 30, 2010.
U.S. Appl. No. 12/750,063 of Okuno et al., filed Mar. 30, 2010.

* cited by examiner

*Primary Examiner* — Victor MacArthur
*Assistant Examiner* — Jay R Ripley
(74) *Attorney, Agent, or Firm* — Nixon & Vanderhye PC

(57) ABSTRACT

A connector includes a body portion having a cylindrical insertion hole for inserting therein a connection member, and a cylindrical connector cover. The body portion includes a claw portion elastically deformable to a radial outside. The connector cover includes a claw release portion through which a limitation of an elastic deformation of the claw portion is released, and a claw limiting portion configured to limit the elastic deformation of the claw portion toward the radial outside. When the connector cover is located at a release position, the claw release portion is opposite to the claw portion but the claw limiting portion is not opposite to the claw portion. In contrast, when the connector cover is moved to a lock position, the claw limiting portion is opposite to the claw portion, and the claw portion is engaged with an engagement portion provided on the connection member.

14 Claims, 8 Drawing Sheets

CONNECTOR

CROSS REFERENCE TO RELATED APPLICATION

This application is based on Japanese Patent Application No. 2009-085941 filed on Mar. 31, 2009, the contents of which are incorporated herein by reference in its entirety.

FIELD OF THE INVENTION

The present invention relates to a connector adapted as a connection portion of a fluid pipe.

BACKGROUND OF THE INVENTION

European patent No. 1394402A2 describes regarding a connector adapted as a connection portion between an injector and a low pressure fuel pipe in a fuel injection device.

In the European patent No. 1394402A2, the connector includes a cylindrical body portion having an insertion hole in which a connection member of the injector is inserted, and a connector cover which covers the cylindrical body portion.

The body portion is provided with a claw portion, which is engaged with an outer peripheral surface of the connection member of the injector when the connection member is inserted into the insertion hole of the body portion. The claw portion extends from an inlet portion of the insertion hole to a direction along the connection member to be connected, and is configured to be elastically deformable toward a radial outside of the insertion hole. Furthermore, a knob portion is provided on a side surface of the body portion, and extends in a radial outside of the body portion to be exposed outside from the connector cover.

The connector cover has a cylindrical shape having a cap at one end side, and is held to be slidable in an axial direction of the body portion.

In a connection state were the connector and the connection member of the injector are connected, the knob portion of the body portion is pushed toward the connection member in a state where the connector cover is positioned at a side opposite to the insertion hole with respect to the body portion, so that the connection member is inserted into the insertion hole of the body portion. Thereafter, the connector cover is pushed toward the connection member, so that the claw portion of the body portion is covered by the connector cover, thereby setting a lock state at which the engagement between the claw portion and the connection member of the injector is maintained while an elastic deformation of the claw portion toward radial outside is limited.

When the body portion of the connector and the connection member of the injector are connected, the body portion is moved toward the connection member along an extension direction of the insertion hole of the body portion. Thus, it is prefer to directly push an end portion of the body portion, opposite to the inlet side of the insertion hole, toward the connection member.

However, in the above connector, the end portion of the body portion opposite to the inlet side of the insertion hole is covered by the connector cover. Therefore, when the body portion of the connector and the connection member of the injector are connected, it is difficult to directly push the end portion of the body portion positioned on an extending line of the insertion hole. Thus, the knob portion which is not positioned on the extending line of the insertion hole is pushed toward the connection member. Accordingly, it is difficult to straightly push the body portion along the extending line of the insertion hole, and thereby connection operation for connecting between the body portion of the connector and the connection member of the injector cannot be easily accurately performed.

SUMMARY OF THE INVENTION

In view of the foregoing problems, it is an object of the present invention to provide a connector, by which a connection operation can be easily performed.

According to an aspect of the present invention, a connector for connecting a connection member in which a fluid flows to a pipe member, includes a body portion having an inner peripheral surface defining a cylindrical insertion hole for inserting therein the connection member, and a cylindrical connector cover located to cover an outer peripheral surface of the body portion in which the insertion hole is provided. The body portion includes a claw portion that is engaged with an engagement portion provided on an outer peripheral surface of the connection member, in a connection state where the connection member is inserted into the insertion hole of the body portion. The claw portion is configured to be elastically deformable to a radial outside of the insertion hole. The connector cover is held to the body portion to be slidable in a direction parallel with a connection direction between the connection member and the body portion, in a state where an end portion of the body portion, opposite to an inlet side of the insertion hole, is exposed to exterior from the connector cover. Furthermore, the connector cover includes a claw release portion through which a limitation of an elastic deformation of the claw portion toward the radial outside is released, and a claw limiting portion configured to limit the elastic deformation of the claw portion toward the radial outside. The claw limiting portion is located in the connector cover, on a side of the connection member than the claw release portion in the connection direction. When the connector cover is located at a release position where the body portion is detachable from the connection member, the claw release portion is opposite to the claw portion, and the claw limiting portion is not opposite to the claw portion. Furthermore, when the connector cover is moved from the release position to a lock position, the claw limiting portion is opposite to the claw portion, and the claw portion is engaged with the with the engagement portion provided on the outer peripheral surface of the connection member.

Because the claw limiting portion is located in the connector cover on the side of the connection member than the claw release portion in the connection direction, the claw release portion is positioned on the side of the body portion than the claw limiting portion in the connection direction. Thus, when the connector and the connection member are connected, after the connection member is inserted into the body portion at the release position of the connector cover, the connector cover is pulled to the body portion thereby setting the lock position. Furthermore, by directly pushing the end portion of the body portion, exposed to the exterior from the cover member, toward the connector member in the connection direction, the body portion can be pushed to the connection member, thereby easily performing the connection between the body portion and the connection member. Accordingly, it is unnecessary to push the connector cover toward the connection member when the connector cover is locked.

For example, the connector cover includes a cylindrical portion that covers a part of the body portion. In this case, the claw release portion may be an opening portion opened radially in the cylindrical portion of the connector cover, or may be a recess portion recessed from an inner peripheral surface of the cylindrical portion of the connector cover to a radial outside.

The connector cover may include a knob portion protruding to a radial outside, and the knob portion may be located at a position of the connector cover, close to the end portion of the body portion. In this case, it is possible for a user to push the end portion of the body portion by using the first finger while handling the knob portion by the other fingers of the user.

The end portion of the body portion, exposed from the connector cover to the exterior, can be positioned on an extension line of the connection direction between the body portion and the connection member. Thus, the pushing force for pushing the end portion of the body portion can be effectively transmitted to the body portion in the connection direction.

The body portion may include a plurality of the claw portions arranged in a circumference direction of the insertion hole. In this case, the connector cover includes a plurality of claw releasing portions provided to correspond to the respective claw portions. Furthermore, the claw limiting portion may be a circular portion provided at an end portion of the connector cover, on a side of the connection member in the connection direction.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Figure 1:
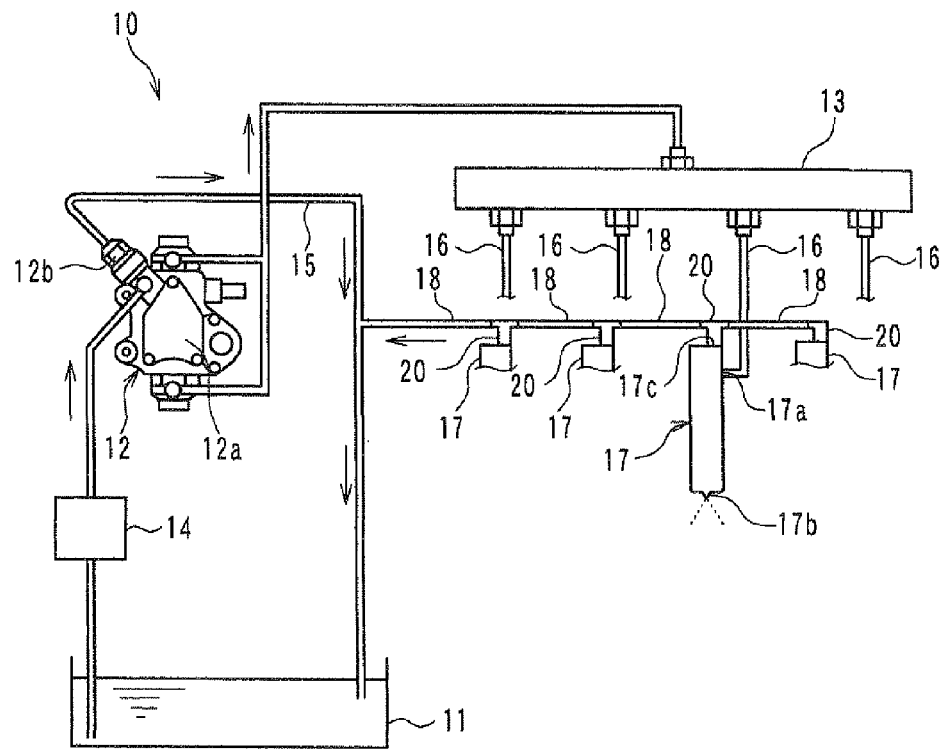
FIG. 1 is a schematic diagram of a fuel injection device according to a first embodiment of the invention.

Embodiments of the present invention will be described with reference to the accompanying drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration.

(First Embodiment)

A first embodiment of the present invention will be now described with reference to FIGS. 1 to 7. FIG. 1 is a schematic diagram showing an accumulator-type fuel injection device 10 that is typically used for a diesel engine in the present embodiment. The fuel injection device 10 includes a fuel tank 11, a fuel supply pump 12, a common rail 13, an injector 17, and the like. The fuel injection device 10 is configured to inject fuel (fluid) stored in the fuel tank 11 into respective cylinders of an internal combustion engine.

The fuel in the fuel tank 11 is supplied to the common rail 13 by the fuel supply pump 12. A fuel filter 14 is located between the fuel tank 11 and the fuel supply pump 12.

The fuel supply pump 12 includes a feed pump portion (not shown), and a high-pressure pump portion 12a. The feed pump portion is adapted to draw fuel from the fuel tank 11 and to supply the drawn fuel to the high-pressure pump portion 12a. The high-pressure pump portion 12a pressurizes the fuel supplied from the feed pump portion, and sends the pressurized fuel to the common rail 13. The feed pump portion and the high-pressure pump portion 12a may be driven by an internal combustion engine or an electrical pump.

The high-pressure pump portion 12a is provided with a pressure adjustment valve 12b (overflow adjustment valve) which causes the fuel in the fuel tank 11 to flow out when a pressure in the pump 12 is more than a predetermined pressure. The fuel adjustment valve 12b is connected to the fuel tank 11 via a fuel return pipe 15.

The common rail 13 is configured as an accumulator in which the fuel pressurized in the high-pressure pump portion 12a can be maintained at a high pressure, and is connected to a fuel introduction port 17a of an injector 17 via a high-pressure fuel pipe 16. Generally, a plurality of the injectors 17 (e.g., four) and high-pressure fuel pipes 16 are provided to correspond to the plural cylinders of the internal combustion engine, respectively.

The high-pressure fuel accommodated in the common rail 13 is supplied to the injectors 17 via the high-pressure fuel pipes 16, and is injected into respective cylinders of the internal combustion engine via injection holes 17b of the injectors 17. Each of the injectors 17 is controlled by a controller to be opened for a predetermined time at a predetermined timing.

The injector 17 is provided with a fuel flow-out port 17c from which overflow fuel (i.e., leak fuel) flows out. The fuel overflowing from the injector 17 is, for example, a surplus fuel which is not injected from the injector 17 in the fuel supplied from the common rail 13 to the injector 17, or a fuel discharged from a control chamber 175a inside of the injector 17 shown in FIG. 2.

A low pressure fuel pipe 18 is connected to the respective fuel flow-out ports 17c. The leak fuel flowing out from the fuel flow-out port 17c to the low pressure fuel pipe 18 is returned to the fuel tank 11 together with the fuel flowing through the fuel return pipe 15. A connector 20 is located at each connection portion between the fuel flow-out port 17c of the injector 17 and the low pressure fuel pipe 18.

Figure 2:
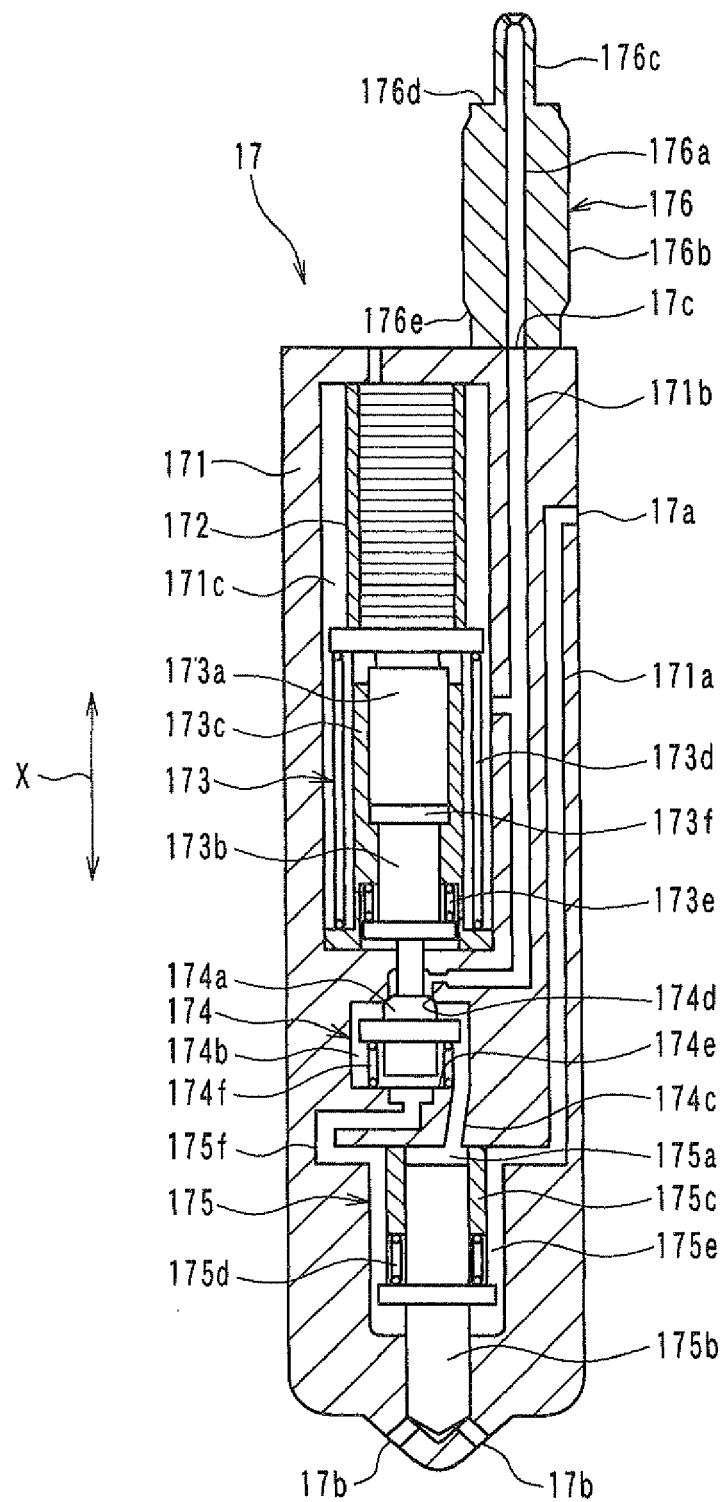
FIG. 2 is a schematic vertical cross-sectional view showing an injector in the fuel injection device of FIG. 1.

FIG. 2 is a cross-sectional view showing one example of the injector 17. The injector 17 includes a piezo actuator 172, a drive power transmission portion 173, a control valve portion 174 and a nozzle portion 175, which are accommodated inside of an approximately cylindrical injector body 171. The piezo actuator 172, the drive power transmission portion 173, the control valve portion 174 and the nozzle portion 175 are arranged in this order in an axial direction X of the injector body 171, as shown in FIG. 2.

The fuel introduction port 17a for introducing high-pressure fuel from the common rail 13 is opened at a side wall of the injector body 171. The injection ports 17b for injecting high-pressure fuel are opened at a tip end portion of the injector body 171 on a side of the nozzle portion 175 (e.g., a lower end side of FIG. 2). The fuel flow-out port 17c for flowing out of the leak fuel is provided at an end surface of the injector body 171 on a side of the piezo actuator 172 (e.g., an upper side of FIG. 2). A connection member 176 is disposed at a position of the injector body 171, where the fuel flow-out portion 17c is provided, to extend in the axial direction X.

A high pressure passage 171a is provided in the injector body 171 to communicate with the fuel introduction port 17a. The high pressure passage 171a is provided in the injector body 171 to extend in the axial direction X. A low pressure passage 171b is provided in the injector body 171 to communicate with the fuel flow-out portion 17c, and extends in parallel with the high pressure passage 171a in the axial direction X. A receiving space 171c, in which the piezo actuator 172 and the drive power transmission portion 173 are received, is provided in the injector body 171. The low pressure passage 171b is provided in the injector body 171 to communicate with the receiving space 171c.

The piezo actuator 172 is actuated by a drive circuit (not shown), and is configured to extend or contract in the axial direction X.

The drive power transmission portion 173 includes first and second pistons 173a, 173b movable integrally with the piezo actuator 172, a cylindrical member 173c which slidably hold the first and second pistons 173a, 173b, a first spring 173d which causes the first piston 173a to be biased toward the piezo actuator 172 so as to contact the piezo actuator 172, and a second spring 173e which causes the second piston 173b to be biased toward the control valve 174a of the control valve portion 174. An oil chamber 173f, in which an operation oil (e.g., fuel in the present embodiment) is filled, is provided between the first and second pistons 173a, 173b.

The control valve portion 174 includes a control valve 174a configured as a three-way valve, which is accommodated in a valve chamber 174b. The valve chamber 174b is made to generally communicate with the control chamber 175a of the nozzle portion 175 via a communication passage 174c.

The control valve 174a is configured to be movable integrally with the second piston 173b of the drive power transmission portion 173. The valve chamber 174b is provided with a low-pressure side seat surface 174d and a high-pressure side seat surface 174e on which the control valve 174a is selectively seated.

A communication port communicating with the low pressure passage 171b is open in the low-pressure side seat surface 174d. A communication port communicating with the high pressure passage 171a via the communication passage 175f of the nozzle portion 175 is open in the high-pressure side seat surface 174e. A spring 174f is disposed to cause the control valve 174a to be biased toward the second piston 173b of the drive power transmission portion 173 so that the control valve 174a contacts the second piston 173b.

When the piezo actuator 172 extends or contracts, the first and second pistons 173a, 173b of the drive power transmission portion 173 and the control valve 174a of the control valve portion 174 displace in the axial direction X, so that the control valve 174a can be selectively seated on the low-pressure side seat surface 174d or the high-pressure side seat surface 174e. Thus, the pressure in the control chamber 175a of the nozzle portion 175 can be increased or decreased.

The nozzle portion 175 includes a nozzle needle 175b extending in the axial direction X, a cylinder member 175c arranged at an outer peripheral side of the nozzle needle 175b, and a needle spring 175d causing the nozzle needle 175b to be biased to a side of the injection holes 17b.

The control chamber 175a of the nozzle portion 175 is defined by using an end surface of the nozzle needle 175b on a side of the valve chamber 174b and an end surface of the cylinder member 175c. The control chamber 175a is made to generally communicate with the valve chamber 174b of the control valve 174, so as to generate a back pressure to the nozzle needle 175b. The back pressure of the control chamber 175a is adapted to cause the nozzle needle 175b to be biased in a valve-close direction together with the needle spring 175d.

An oil storage chamber 175e, communicating with the high pressure passage 171a and the injection holes 17b, is provided at an outer peripheral side of the nozzle needle 175b and the cylinder member 175c. The oil storage chamber 175e communicates with a communication port of the high-pressure side seat surface 174e of the control valve portion 174 via a communication passage 175f. The oil storage chamber 175e is provided such that the pressure of the high-pressure fuel of the oil storage chamber 175e causes the nozzle needle 175b to be biased in a valve-open direction.

FIG. 2 shows a non-injection state of the injector 17. In the non-injection state of the injector 17, the nozzle needle 175b can be seated by the back pressure of the control chamber 175a and the biasing force of the needle spring 175d. Therefore, a fuel supply from the oil storage chamber 175e to the injection holes 17b is shut.

In contrast, in an injection state of the injector 17, the piezo actuator 172 is actuated to be extended in the axial direction X, and thereby the pressure of the control chamber 175a of the control valve portion 174 is reduced. Thus, the nozzle needle 175b moves upwardly against to the biasing force of the needle spring 175d of the nozzle needle 175b, so that the fuel stored in the oil storage chamber 175 is injected from the injection holes 17b.

In the injector 17, the connection member 176 to be connected to the connector 20 is disposed at a position where the fuel flow-out port 17c is provided in the injector body 171.

The connection member 176 of the injector 17 is formed into approximately a cylindrical shape extending in the axial direction X, and is made of a stainless or a carbon steel. One end portion (e.g., a lower end portion) of the connection member 176 is fixed to the injector body 171 at a position where the fuel flow-out port 17c is formed. The connection member 176 and the injector body 171 can be fixed by screwing, fitting, resinous bonding, a melting or the like. The connection member 176 may be molded integrally with the injector body 171 by using the same material as the injector body 171.

A fuel passage 176a communicating with the fuel flow-out port 17c of the injector body 171 is provided within the connection member 176. The connection member 176 includes a large outer diameter portion 176b on a side of the injector body 171 (e.g., the lower side in FIG. 2), and a small outer diameter portion 176c on a side opposite to the injector body 171 (e.g., the upper side in FIG. 2).

Thus, as shown in FIG. 2, a step surface 176d is formed at a boundary between the large outer diameter portion 176b and the small outer diameter portion 176c. A tilt surface 176e is provided on the large outer diameter portion 176b at a position close to the injector body 171. The tilt surface 176e of the connection member 176 is configured such that the outer diameter of the tilt surface 176e is reduced as toward the injector body 171.

A tip portion of the small outer diameter portion 176c is formed into a round shape by an orifice throttling. Therefore, the tip portion of the small outer diameter portion 176c is adapted as a throttle portion.

Figure 3:
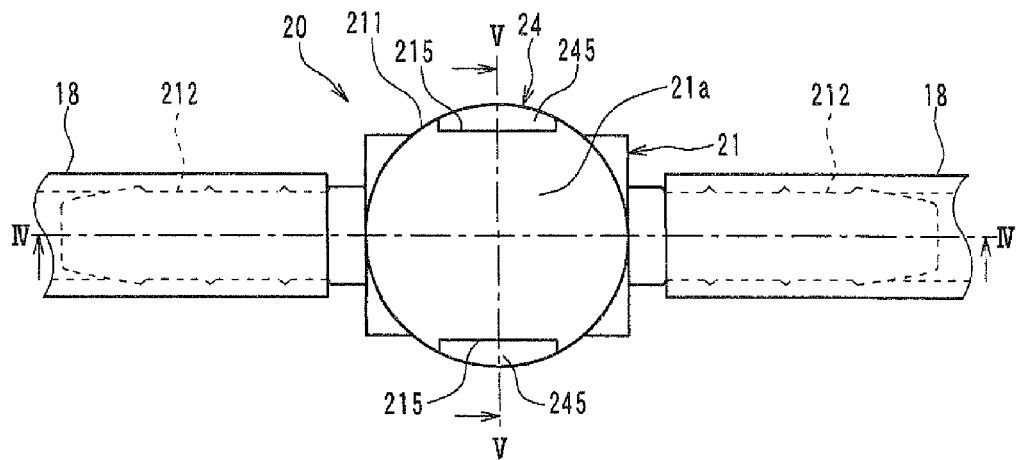
FIG. 3 is a top view showing a connection structure between a connection member of the injector and a low-pressure fuel pipe, with a connector according to the first embodiment.
Figure 4:
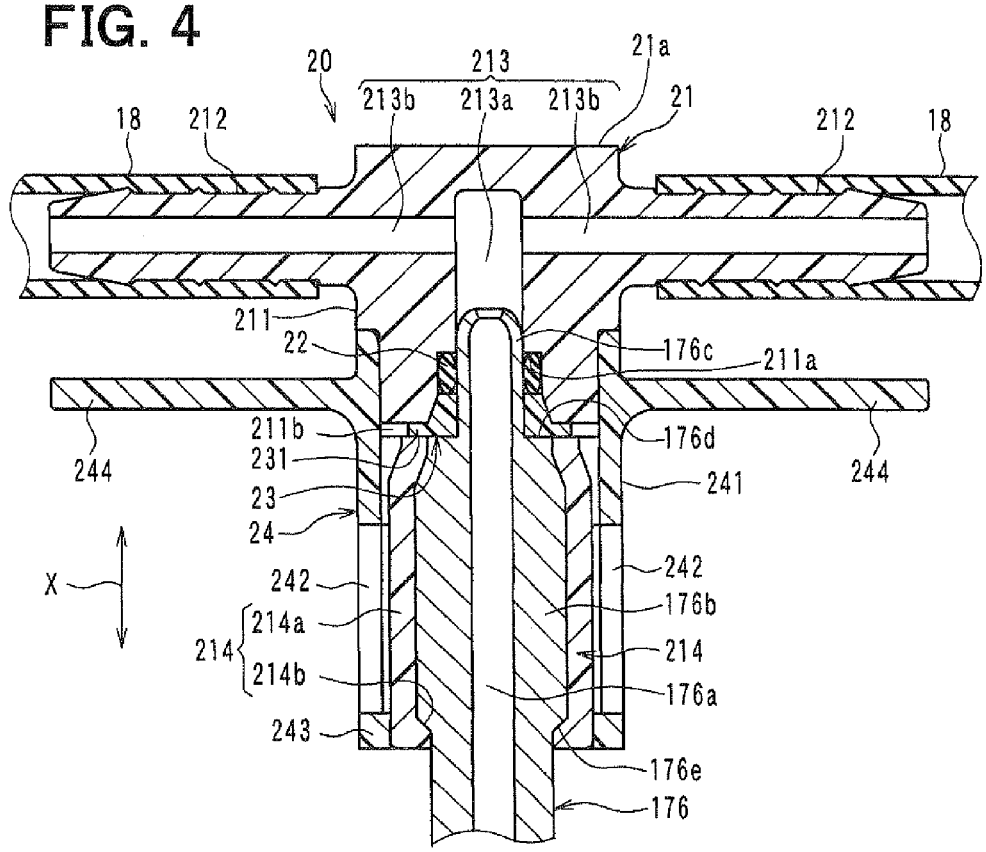
FIG. 4 is a cross-sectional view taken along the line IV-IV in FIG. 3.
Figure 5:
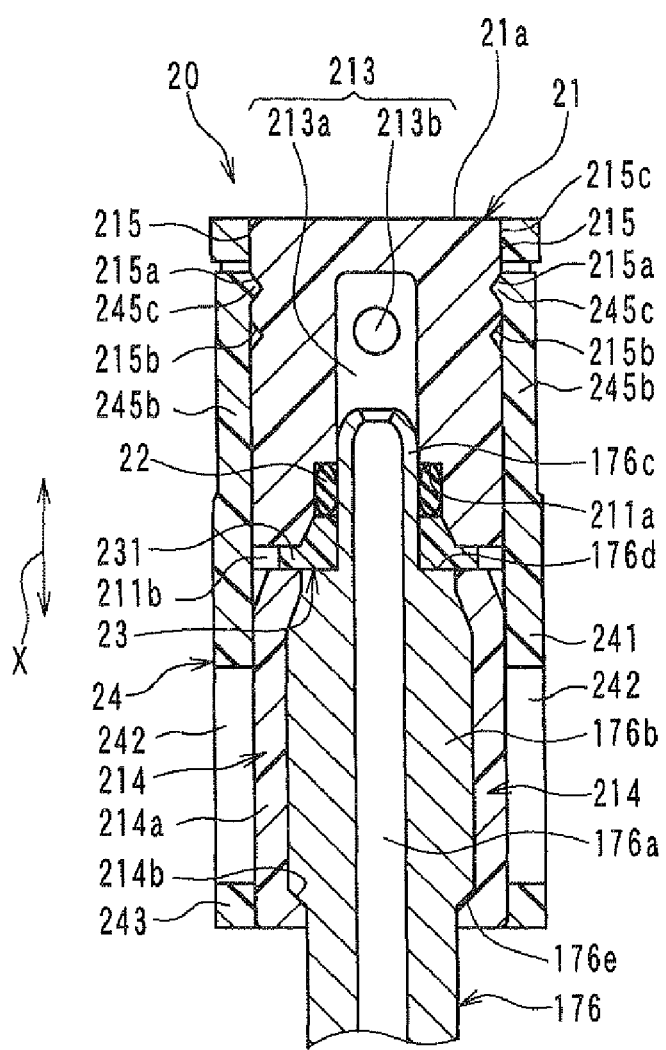
FIG. 5 is a cross-sectional view taken along the line V-V in FIG. 3.
Figure 6:
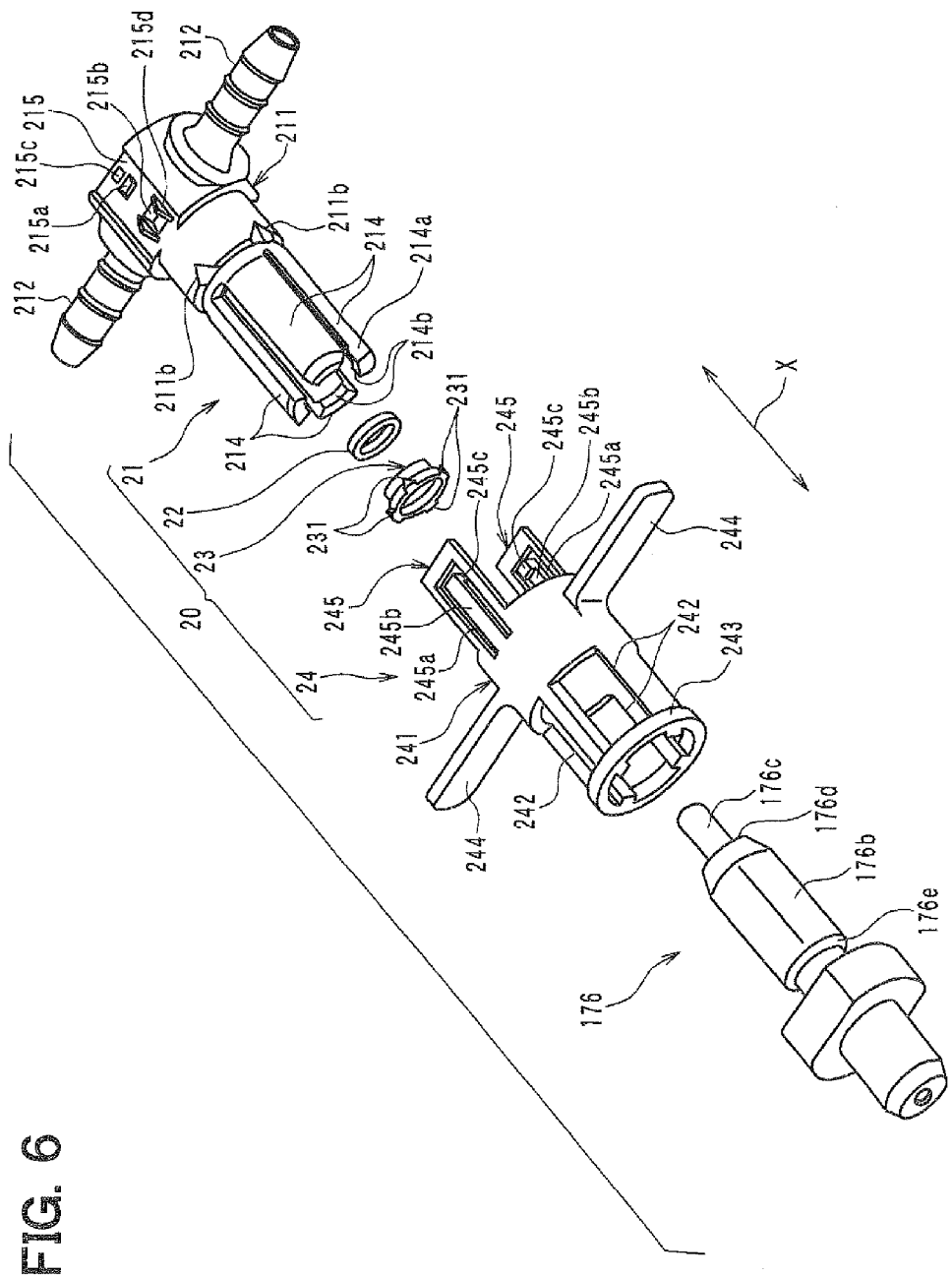
FIG. 6 is a disassembled perspective view showing a connection structure between the connection member and the connector, according to the first embodiment.

Next, a connection structure between the connection member 176 of the injector 17 and the low pressure fuel pipe 18 via the connector 20 will be described. FIG. 3 is a top view showing the connection structure between the connection member 176 of the injector 17 and the low pressure fuel pipe 18 via the connector 20. FIGS. 4 and 5 are cross-sectional views taken along the lines IV-IV and V-V in FIG. 3, and FIG. 6 is disassembled perspective view showing the connection structure. In FIGS. 4 to 6, X indicates an axial direction which corresponds to an extending direction of a first hole portion (insertion hole) 213a. The axial direction X corresponds to an extending direction of the connection member 176 inserted into the first hole portion 213a, and a connection direction between the body portion 21 and the connection member 176.

The connector 20 shown in FIGS. 4 to 6 is any one of first, second and third connectors 20 from the left side in FIG. 1, among the four connectors 20 shown in FIG. 1. The connector 20 shown in FIGS. 3 to 6 is a type connected with two low pressure fuel pipes 18

The connector 20 includes a body portion 21 connected to the connection member 176 and the two low pressure fuel pipes 18, a circular O-ring 22 for sealing between the body portion 21 and the connection member 176, a circular O-ring holding member 23 for holding the O-ring 22 in the body portion 21, and a connector cover 24 disposed to keep a connection state between the body portion 21 and the connection member 176.

The body portion 21 is molded integrally by using a resin such as polyamide (PA), polyphenylene sulfide (PPS), polyphtalamide (PPA) or the like.

As shown in FIG. 4, the body portion 21 is provided with a first connection portion 211 connected to the connection member 176, and two second connection portions 212 connected to the two low pressure fuel pipes 18. The first connection portion 211 is provided to extend in a direction parallel with the axial direction X, and the second connection portions 212 are provided to extend in a direction perpendicular to the axial direction X. As shown in FIG. 4, the two second connection portions 212 extend from an end portion of the first connection portion 211 to be opposite to each other, so that the body portion 21 is formed into approximately a T-shape.

An approximately T-shaped through hole 213 is provided within the body portion 21 to communicate with the fuel passage 176a of the connection member 176 and each of the two low pressure fuel pipes 18. For example, the through hole 213 is configured by a cylindrical first hole portion 213a extending in a direction parallel to the axial direction X within the first connection portion 211, and two cylindrical second hole portions 213b provided in the two second connection portions 212 to extend in direction perpendicular to the axial direction X.

In the example of FIG. 4, a rubber hose may be used as the low pressure fuel pipe 18. The two second connection portions 212 are respectively inserted into the two low pressure fuel pipes 18, to be connected to the two low pressure fuel pipes 18, respectively.

As shown in FIG. 1, the rightmost connector 20 among the four connectors 20 is connected to only one low pressure fuel pipe 18. In this case, only one second connection portion 212 is provided in the body portion 21. For example, when the second connection portion 212 extends in a direction perpendicular to the axial direction X, the body portion 21 is formed approximately into a L-shape entirely. Alternatively, when the second connection portion 212 extends in a direction parallel with the axial direction X, the body portion 21 is formed approximately into a I-shape entirely. That is, the one second connection portion 212 may be provided in the body portion 21 to extend in a direction substantially perpendicular to the axial direction X or a direction parallel to the axial direction X or a direction bent from the axial direction X, without being limited to the two second connection portions 212 shown in FIG. 4.

As shown in FIG. 4, the small outer diameter portion 176c of the connection member 176 is inserted into the first hole portion 213a of the through hole 213. Therefore, the first hole portion 213a of the through hole 213 is adapted as an insertion hole into which the connection member 176 is inserted in the connection direction corresponding to the axial direction.

A step portion 211a is provided in an inner peripheral surface of the first connection portion 211 defining the first hole portion 213a, so that the radial dimension of the first hole portion 213a is enlarged by the step portion 211a at an insertion side (e.g., lower side in FIG. 4) of the connection member 176. The O-ring 22 is disposed in the step portion 211a, and an O-ring holding portion 23 is arranged at an insertion inlet side of the first hole portion 213a, than the position of the O-ring 22. The O-ring 22 is adapted to liquid-tightly seal a clearance between the inner peripheral surface of the body portion 21 defining the first hole portion 213a, and an outer peripheral surface of the small outer diameter portion 176c of the connection member 176.

The O-ring holding member 23 is molded integrally by using a resin, for example. Plural protrusion portions 231 (e.g., four protrusion portions in FIGS. 4 and 6) protruding radially outwardly are provided at plural positions on an outer peripheral portion of the O-ring holding member 23. As shown in FIG. 6, plural recess portions 211b (e.g., four recess portions) are provided in the body portion 21, at positions where the protrusion portions 211b of the O-ring holding portion 23 are provided. The recess portions 211b is provided at the insertion inlet side of the first insertion hole 213a, than an arrangement position where the O-ring 22 is provided.

The plural recess portions 211b are arranged to respectively correspond to protrusion portions 231 of the O-ring holding members 23. By respectively engaging the recess portions 211b with the protrusion portions 231, the O-ring holding member 23 is held by and supported to the body portion 21.

As shown in FIG. 4, the body portion 21 has a top end portion 21a that is an end surface perpendicular to the axial direction X. The top end portion 21a is provided at an end side opposite to the insertion inlet side of the first hole portion 213a of the first connection member 211, in the body portion 21. When the connector cover 24 is attached to the body portion 21 as shown in FIGS. 3-5, the top end portion 21a is not covered by the connector cover 24 and is exposed to exterior from the connector cover 24.

A plurality of claw portions 214 are provided in the first connection portion 211 of the body portion 21. The claw portions 214 are provided to extend from a peripheral portion of an insertion inlet port of the first hole portion 213a toward a side of the connection member 176 in the connection direction. In the example of FIG. 6, four claw portions 214 are provided to extend toward the connection member 176 (e.g., lower side in FIG. 4) and to enclose the connection member 176. The claw portions 214 are provided in the body portion 21 to hold the connection member 176 connected to the body portion 21.

Each of the claw portions 214 includes a plate portion 214a extending from the peripheral portion of the insertion inlet port of the first hole portion 213a toward the side of the connection member 176 in the connection direction, that is, toward the lower side in FIG. 4, and a protrusion portion 214b that is provided at a tip end of each plate portion 214a to protrude radially inside.

Each of the plate portions 214a has a circular arc shape in cross section perpendicular to the axial direction X, and the circular arc shape of each plate portion 214a is provided along the outer peripheral surface of the large outer diameter portion 176b of the connection member 176. Because the plate portions 214a are separated from each other in a circumferential direction, each of the plate portions 214a is elastically deformable in a radial outside of the first hole portion 213a used as the insertion hole. Thus, when the claw portions 214 are pressed from its radial inside to its radial outside, the claw portions 214 are expanded and elastically deformed to radial outside. FIG. 4 shows a nature state of the claw portions 214 to which an external force is not applied.

The protrusion portions 214b are provided in the plate portions 214a to be engaged with the tilt surface 176e of the connection member 176. The protrusion portions 214b of the claw portions 214 of the body portion 21 are respectively engaged with the tilt surface 176e of the connection member 176, thereby preventing the connection member 176 from being separated from the connector 20 when the connector 20 is connected to the connection member 176.

The connector cover 24 is disposed to cover the first connection portion 211 of the body portion 21. The connector cover 24 is disposed to be slidable in the axial direction X so as to be switched between a release state and a lock state. Here, the connection direction between the connection member 176 and the first connection portion 211 of the body portion 21 corresponds to the axial direction X. In the release state of the connector cover 24, a connection between the connector 20 and the connection member 176 is released so that the connection member 176 is detachable from the connector 20. In contrast, in the lock state of the connector cover 24, the connection between the connector 20 and the connection member 176 is maintained and is locked.

Figure 7:
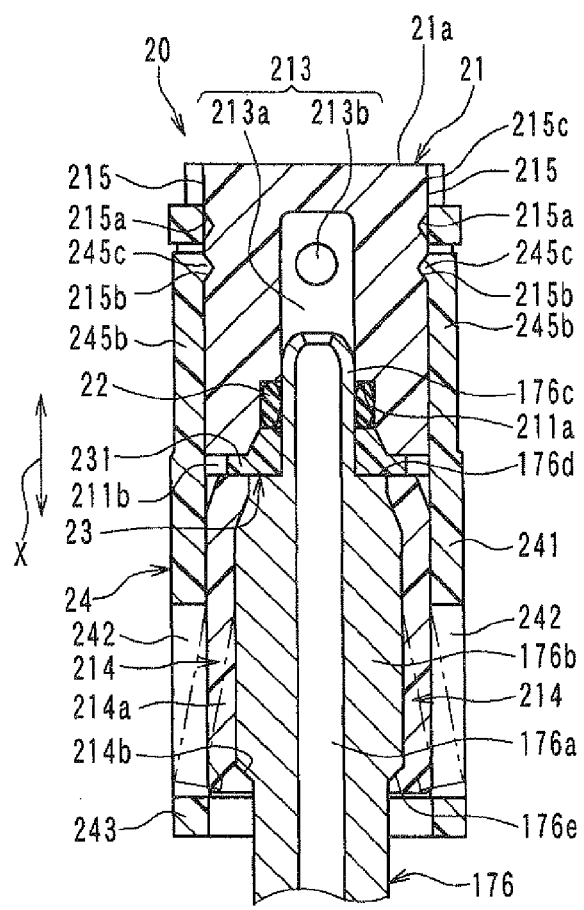
FIG. 7 is a cross-sectional view showing a release state of the connector according to the first embodiment.

FIG. 5 shows the lock state of the connection between the connector 20 and the connection member 176, and FIG. 7 shows the release state of the connection between the connector 20 and the connection member 176.

For example, when the connector cover 24 is moved to a lock position on one side of the body portion 21 in the axial direction X (i.e., upper side in FIG. 5), the connection between the connector 20 and the connection member 176 is locked as shown in FIG. 5. In contrast, when the connector cover 24 is moved to a release position on the other side of the body portion 21 in the axial direction X (i.e., lower side in FIG. 7), the connection between the connector 20 and the connection member 176 is released as shown in FIG. 7.

As shown in FIGS. 4 to 7, the connector cover 24 is provided with a cylindrical portion 241 extending in the axial direction X, two knob portions 244 protruding radially outside from an outer peripheral surface of the cylindrical portion 241, rectangular opening portions 242 opened in the cylindrical portion 241, and a circular portion 243 provided at the other end of the cylindrical portion 241. The connector cover 24 is molded integrally by using a resin. The circular portion 243 is located on the side of the connection member 176, than the opening portions 242, in the connection direction between the body portion 21 and the connection member 176.

The opening portions 242 are provided at plural positions in the outer peripheral surface of the cylindrical portion 241 at the other end side in the axial direction X. The opening portions 242 are provided at plural positions respectively corresponding to the claw portions 214 of the body portion 21 of the connector 20. In the present embodiment, four opening portions 242 are provided to correspond to the four claw portions 214. In the release position of FIG. 7, the connector cover 24 is positioned, such that the opening portions 242 of the connector cover 24 are respectively opposite to the claw portions 214, and the circular portion 243 is not opposite the claw portions 214. Thus, in the release position of the connector cover 24, the plate portions 214a including the protrusion portions 214b can be expanded radially outside of the first hole portion 213a, via the opening portions 242. Therefore, at the release position of the connector cover 24, the claw portions 214 is elastically deformed radially outside via the opening portions 242 of the connector cover 24, respectively. In the present embodiment, the opening portions 242 are adapted as a claw release portion by which a limitation of the elastic deformation of the claw portions 214 is released.

The circular portion 243 is located at the other end of the cylindrical portion 241 in the axial direction X, to be positioned on the side of the connection member 176 with respective to the opening portions 242 in the axial direction X. At the lock position of the connector cover 24, the connector cover 24 is positioned, such that the opening portions 242 of the connector cover 24 are respectively opposite to the claw portions 214, and the circular portion 243 is opposite to radial outside of the claw portions 214. Thus, an expansion of the claw portions 214 extending toward the radially outside of the first hole portion 213a can be limited, thereby limiting an elastic deformation of the claw portions 214 toward radially outside. In the present embodiment, the circular portion 243 is adapted as a claw limiting portion which limits the elastic deformation of the claw portions 214 deformed toward the radial outside.

When the connector cover 24 is attached to the body portion 21, the cylindrical portion 241 of the connector cover 24 covers a side surface of the first connection portion 211, positioned on the side of the connection member 176 than the second connection portion 212 in the axial direction X, so as to expose the top end portion 21a of the body portion 21 from the connector cover 24 to exterior.

The connector cover 24 is provided with the two knob portions 244 protruding from the outer peripheral surface of the cylindrical portion 241 to opposite outer sides in the radial direction, and two plate portions 245 protruding from an end portion of the cylindrical portion 241 to the one side in the axial direction X.

As shown in FIGS. 4 and 6, the two knob portions 244 are provided in the cylindrical portion 241 at the one end side of the axial direction X, that is, at the side of the body portion 21 in the connection direction between the connection member 176 and the body portion 21. Therefore, the knob portions 244 are positioned close to the top end portion 21a of the body portion 21. Thus, when the first finger of a user is positioned at the top end portion 21a of the body portion 21, it is possible for the user to handle the knob portions 244 by using the other fingers.

Each of the two plate portions 245 is provided with a claw portion 245b for setting the lock position and the release position of the connector cover 24.

Each of the plate portions 245 is provided to be accommodated in a concave portion 215 provided on the outer surface of the first connection portion 211 of the connector 20.

As shown in FIG. 6, a U-shape through groove 245a is formed in each plate portion 245, so as to form the claw portion 245b formed by the U-shape through groove 245a. Therefore, the claw portion 245b extends from the one end portion of the cylindrical portion 241 to be deformable in the thickness direction (i.e., radial direction of the cylindrical portion 241).

A protrusion portion 245c is provided at a tip end of the claw portion 245b to protrude radially inside of the claw portion 245b. Furthermore, a first recess portion 215a and a second recess portion 215b are provided in the concave portion 215 of the body portion 21, so that the protrusion portion 245c of the claw portion 245b is capable of engaging with the first recess portion 215a or the second recess portion 215b.

When the connector cover 24 is moved to the release position shown in FIG. 7, the protrusion portion 245c of each claw portion 245b is engaged with the second recess portion 215b. When the connector cover 24 is moved to the lock position shown in FIG. 5, the protrusion portion 245c of each claw portion 245b is engaged with the first recess portion 215a.

As shown in FIG. 6, a coloration portion 215c is formed to color an end position of the concave portion 215 in the axial direction X. The coloration portion 215c is colored by a layer marking. For example, when the body portion 21 is black, the coloration portion 215c is colored to be white. The position of the coloration portion 215c is set, such that the coloration portion 215c is covered by the plate portion 245 when the connector cover 24 is placed at the lock position, and the coloration portion 215c is exposed from the plate portion 245 to the exterior when the connector cover 24 is placed at the release position. That is, when the connector cover 24 is placed at the release position, the coloration portion 215a can be watched by a user from exterior. Thus, it is possible to easily determine whether the connector cover 24 is positioned at the lock position or the release position.

Protrusion portions 215d are provided in the concave portion 215 of the connector 20, to be inserted into the through groove 245a of the plate portion 245. Because the protrusion portions 215d are slidably inserted into the through groove 245a of the plate portion 245 of the connector cover 24, the movement of the connector cover 24 in the axial direction X can be guided.

Next, assemble of the connector 20, and connection steps for connecting the injector 17 and the low pressure fuel pipe 18 by using the connector 20 will be described.

First, assemble of the connector 20 will be described. As shown in FIG. 4, the O-ring 22 is inserted into the first hole portion 213a of the body portion 21, and then the O-ring holding member 23 is inserted into the first hole portion 213a of the body portion 21. The protrusion portions 231 of the O-ring holding member 23 are engaged with the recess portions 211b of the body portion 21, respectively, so that the O-ring holding member 23 is fixed to the body portion 21. Then, the connector cover 24 is attached to the body portion 21 to cover the peripheral surface of the body portion 21, thereby finishing the assemble of the connector 20.

The connection for connecting the connection member 176 of the injector 17 and the low pressure fuel pipe 18 by using the connector 20 will be described.

First, the second connection portion 212 of the body portion 21 of the connector 20 is inserted into the end portion of the low pressure fuel pipe 18, so that the connector 20 and the low pressure fuel pipe 18 are connected to each other.

Next, the connector cover 24 is connected to the connector 20 to be located at the release position shown in FIG. 7, and then the connection member 176 of the injector 17 is inserted into the first hole portion 213a as the insertion hole of the body portion 21. At this time, the top end portion 21a of the body portion 21, which is an end side opposite to the insertion inlet port of the first hole portion 213a, is exposed from the connector cover 24 to the exterior. Thus, by pushing the top end portion 21a of the body portion 21 of the connector 20 toward the connection member 176 in the connection direction, the connection member 176 is inserted into the insertion hole 213a of the body portion 21. For example, a user may push the top end portion 21a of the body portion 21 toward the connection member 176 in the connection direction by using the first fingers. Therefore, the connection member 176 can be easily accurately inserted into the first hole portion 213a of the body portion 21 of the connector 20.

When the connection member 176 is inserted into the first hole portion 213a of the body portion 21 of the connector 20, the protrusion portions 214b of the claw portions 214 of the connector 20 are located at positions interfering with the large outer diameter portion 176b of the connection member 176. However, as in the chain line in FIG. 7, because the claw portions 214 of the connector 20 can be deformed from a side of the large outer diameter portion 176b of the connection member 176 toward the opening portions 242 of the connector cover 24, it is possible to insert the connection member 176 into the first hole portion 213a as the insertion hole.

The connection member 176 is further inserted into the first hole portion 213a of the connector 20, so that the step surface 176d of the connection member 176 contacts the O-ring holding member 23. At this time, the protrusion portions 214b of the claw portions 214 of the body portion 21 can be engaged with the tile surface 176e of the connection member 176.

Then, the connector cover 24 is moved from the release position in FIG. 7 to the lock position in FIG. 5. For example, a user may push the top end portion 21a of the body portion 21 toward the connection member 176 in the connection direction by using the first fingers, while pulling the knob portions 244 of the connector cover 24 toward the body portion 21 by using the other fingers, so that the connector cover 24 is set at the lock position. At the lock position of the connector cover shown in FIG. 5, because the circular portion 243 of the connector cover 24 covers the protrusion portions 214b of the claw portions 214 of the connector 20 from the radial outside, the elastic deformation of the claw portion 214 can be limited, thereby maintaining the engagement state between the protrusion portions 214b of the claw portion 214 and the tilt surface 176e of the connection member 176. Thus, the connection member 176 is not removed from the connector 20.

With the above steps, the connection between the connection member 176 of the injector 17 and the connector 20 is ended, thereby finishing the connection between the injector 17 and the low pressure fuel pipe 18. At the connection state of the injector 17 and the low pressure fuel pipe 18, the low-pressure fuel flowing out from the fuel flow-out port 17c of the injector 17 flows into the low pressure fuel pipe 18 through the fuel passage 176a of the connection member 176 and the through hole 213 within the connector 20.

When the connection member 176 of the injector 17 and the low pressure fuel pipe 18 are disassembled, the connector cover 24 is moved from the lock position to the release position, and then the connection member 176 is removed and separated from the connector 20. At the release position of the connector cover 24, the claw portions 214 are expanded and elastically deformed radially outside, and the engagement between the protrusion portions 214b and the tilt surface 176e is released, thereby separating the connection member 176 and the connector 20 from each other.

If the top end portion 21a of the body portion 21, opposite to the insertion inlet side of the first hole portion 213a of the body portion 21, is not exposed to the exterior from the connector cover 24, that is, if the top end portion 21a of the body portion 21 is covered by the connector cover 24, it is impossible to directly push the top end portion 21a of the body portion 21 toward the connection member 176 in the connection direction. Thus, in this case, it is difficult to straightly push the body portion 21 in the extending direction of the first hole portion 213a as the insertion hole, toward the connection member 176.

In the present embodiment, the opening portions 242 are provided in the connector cover 24, on the side of the body portion 21 than the circular portion 243, in the connection direction between the connection member 176 and the body portion 21. Thus, when the connector 20 and the connection member 176 are connected, the connector cover 24 is located at the release position with respect to the body portion 21, and the body portion 21 is pushed to the connection member 176 so that the connection member 176 is inserted into the first hole portion 213a of the body portion 213. Thereafter, the connector cover 24 is pulled toward the top end portion 21a of the body portion 21 while pushing the top end portion 21a of the body portion 21 toward the connection member 176 in the connection direction, thereby setting the lock position.

Thus, in the present embodiment, when the connector cover 24 is moved from the release position to the lock position, it is unnecessary to push the connector cover 24 toward the connection member 176. In the present embodiment, the connector cover 24 is held by the body portion 21 while the top end portion 21a of the body portion 21 is exposed from the cover portion 24 to the exterior. Accordingly, when the body portion 21 and the connection member 176 are connected, it is possible to directly push the top end portion 21a of the body portion 21, positioned on the extension line of the first hole portion 213a as the insertion hole. Therefore, the body portion 21 can be easily straightly pushed toward the connection member 176 along the extension line (i.e., axial direction X) of the first hole portion 213a, thereby easily performing the connection between the body portion 21 of the connector 20 and the connection member 176.

According to the present embodiment, by pushing the top end portion 21a of the body portion 21 toward the connection member 176 in the connection direction using the first finger of a user, it is possible for the connection member 176 to be inserted into the body portion 21. Then, by pulling the knob portions 244 of the connector cover 24 toward the top end portion 21a of the body portion 21 using the other fingers of the user while pushing the top end portion 21a of the body portion 21 with the first finger of the user, the lock state of the connector cover 24 can be set from the release state. Thus, the connection operation can be easily performed as compared with a case where the connector cover 24 covers the top end portion 21a of the body portion 21.

(Second Embodiment)

Figure 8:
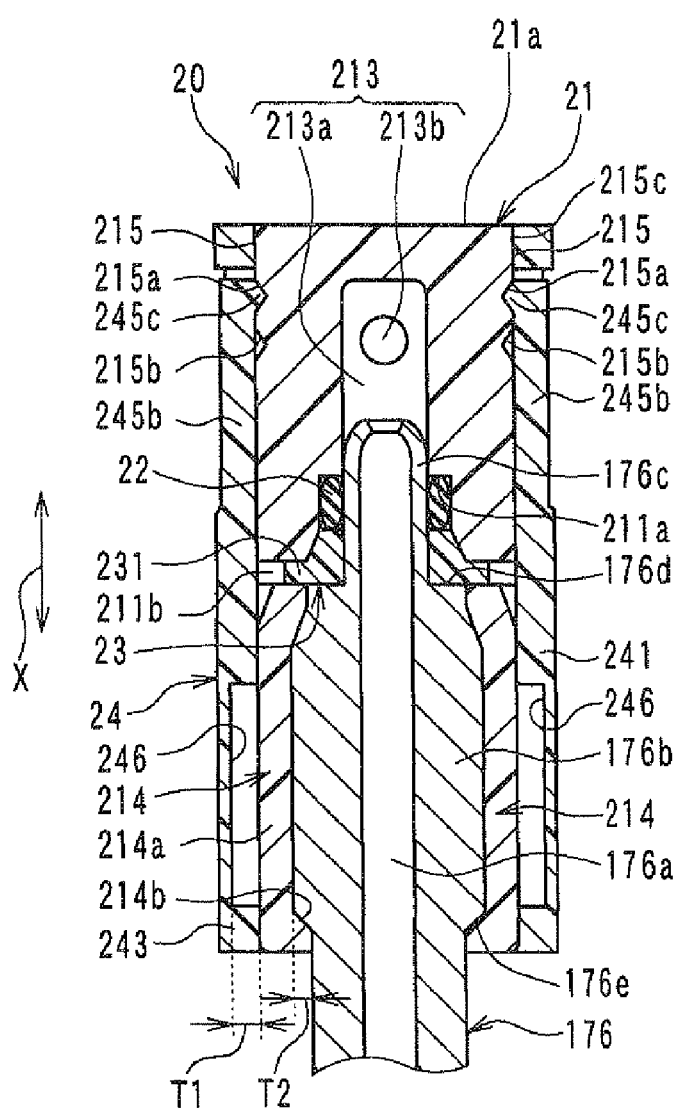
FIG. 8 is a cross-sectional view showing a lock state of a connector according to a second embodiment of the present invention.

A second embodiment of the present invention will be described with reference to FIGS. 8 and 9. FIG. 8 shows a lock state of a connector cover 24, and FIG. 9 shows a release state of the connector cover 24, according to the second embodiment.

In the above-described first embodiment, as the claw release portion, the opening portions 242 are opened at the connector cover 24 so that the claw portions 214 of the connector 20 are expanded radially outside when the connector 20 is connected to the connection member 176. In the second embodiment, as shown in FIGS. 8 and 9, as the claw release portion, recess portions 246 are provided in the inner wall surface of the connector cover 24 to be recessed to radially outside, so that the claw portions 214 of the connector 20 are expanded and elastically deformed radially outside.

As shown in FIG. 8, a part of the cylindrical portion 241 of the connector cover 24 is made thinner so as to form the recess portion 246 recessed from the inner wall surface of the cylindrical portion 241 to radially outside. Furthermore, as shown in FIG. 8, a clearance T1 between the claw portion 214 and the bottom wall surface of the recess portion 246 of the cylindrical portion 241 is made larger than a protrusion dimension T2 of the protrusion portion 214b of the claw portion 214, in the radial direction.

Figure 9:
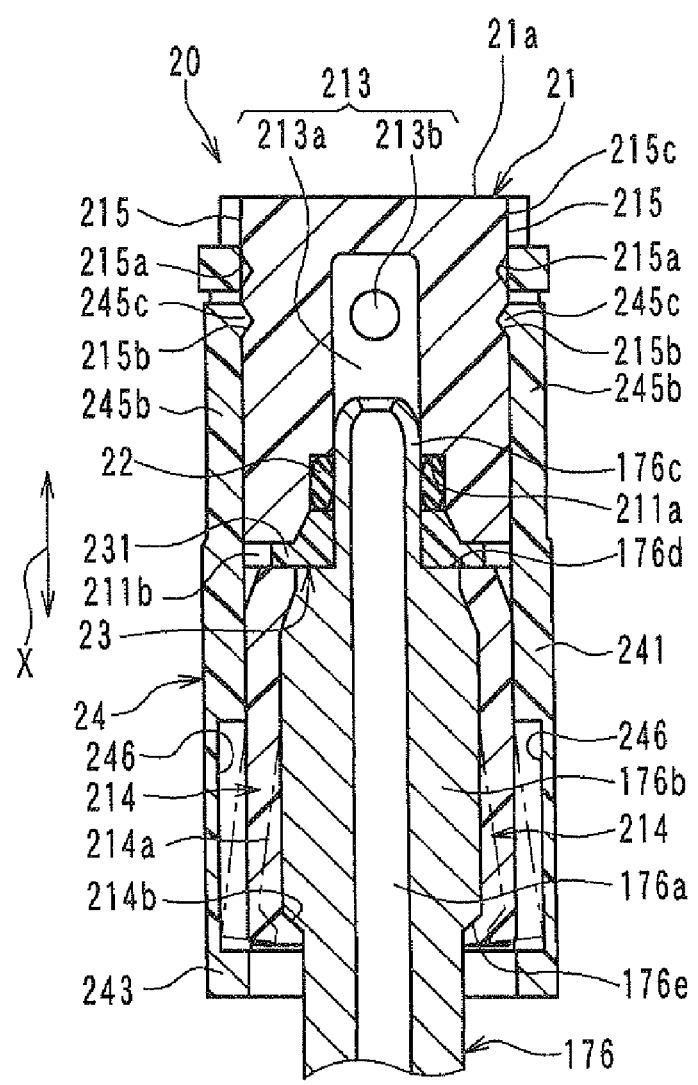
FIG. 9 is a cross-sectional view showing a release state of the connector according to the second embodiment.

Thus, as shown in FIG. 9, when the connector cover 24 is placed at the release position, the claw portions 214 of the body portion 21 can be elastically deformed to a radial outside position at which a detachment of the connection member 176 from the body portion 21 is possible.

In the present embodiment, the claw release portion is configured by the recess portion 246, instead of the opening portion 242 of the first embodiment. That is, by using the recess portion 246 opposite to the claw portion 214, a limitation of the elastic deformation of the claw portions 214 toward the radial outside is released. Even in this case, the effect of the first embodiment can be obtained. In the second embodiment, the other parts are similar to those of the above-described first embodiment.

(Other Embodiments)

Although the present invention has been fully described in connection with the preferred embodiments thereof with reference to the accompanying drawings, it is to be noted that various changes and modifications will become apparent to those skilled in the art.

(1) In the above-described first and second embodiments, all area of the top end surface 21a of the body portion 21 is exposed to exterior from the connector cover 24, as an exposed portion. However, a part area of the top end surface 21a of the body portion 21 may be exposed to exterior from the connector cover 24, as an exposed portion.

In this case, the exposed portion of the body portion 21 exposed from the connector cover 24 to the exterior is positioned on an extension line of the axial direction X of the connection member 176. Thus, by pushing the exposed portion of the body portion 21 toward the connection member 176 along the axial direction X, the body portion 21 can be pushed toward the connection member 176 along the axial direction X, thereby inserting the connection member 176 into the first hole portion 213a as the insertion hole of the body portion 21.

Here, the axial direction of the connection member 176 corresponds to the center line (axial line) of the small outer diameter portion 176c of the connection member 176.

(2) In the above-described first and second embodiments, the circular portion 243 is provided as the claw limiting portion in the connector cover 24 to continuously extend in a circumferential direction, so as to limit and restrict the expansion (elastic deformation) of the claw portion 214 toward radial outside. However, the claw limiting portion may be provided in the connector cover 24 in a partial area in the circumferential direction of the connector cover 24, so as to limit and restrict the elastic deformation of the claw portion 214 toward radial outside. For example, a C-shaped portion may be provided as the claw limiting portion at the end portion of the connector cover 24 in a part area in the circumferential direction.

(3) In the above-described first and second embodiments, the four claw portions 214 are provided in the body portion 21 to be arranged in the circumferential direction. However, the number of the claw portions 214 may be changed. For example, one claw portion 214 may be provided, or plural claw portions such as two or third or more than four may be provided.

(4) In the above-described first and second embodiments, the present invention is applied to the connector 20 connected to the two low pressure fuel pipes 18. However, the present invention may be applied to the rightmost connector 20 in FIG. 1, which is connected to one low pressure fuel pipe.

In this case, the body portion 21 is provided with a single second connection portion 212. For example, the second connection portion 212 may extend in a direction perpendicular to the axial direction X, so that the body portion 21 is formed entirely into a L-shape.

(5) In the above embodiments, the end portion of the second connection portion 212 is inserted into the low pressure fuel pipe 18, so that the low pressure fuel pipe 18 is connected to the second connection portion 212. However, the end portion of the low pressure fuel pipe 18 may be inserted into the second connection portion 212 so as to connect the low pressure fuel pipe 18 and the second connection portion 212, similarly to the connection between the connection member 176 and the first connection portion 211.

In the above-described embodiments, the connector 20 of the present invention is typically applied to the connection between a connection pipe of an injector and a low pressure fuel pipe in a fuel injection device. However, the connector 20 of the present invention can be applied to any connection structure in which the connector 20 is connected to a connection member for a fluid flow.

Such changes and modifications are to be understood as being within the scope of the present invention as defined by the appended claims.

What is claimed is:

1. A connector for connecting a connection member in which a fluid flows to a pipe member, the connector comprising:
    a body portion having an inner peripheral surface defining a cylindrical insertion hole for inserting therein the connection member; and
    a cylindrical connector cover located to cover an outer peripheral surface of the body portion in which the insertion hole is provided, wherein
    the body portion includes a plurality of claw portions adapted to engage an engagement portion provided on an outer peripheral surface of the connection member in a connection state where the connection member is inserted into the insertion hole of the body portion,
    the claw portions are configured to be elastically displaceable in a radial direction with respect to a longitudinal axis of the insertion hole,
    the connector cover is mounted to the body portion to be slidable in a direction parallel with a connection direction between the connection member and the body portion,
    the connector cover includes a claw limiting portion configured to limit elastic displacement of the claw portions outwardly in the radial direction, and a claw release portion configured to allow the elastic displacement of the claw portions outwardly in the radial direction, such that the claw release portion allows more elastic displacement of the claw portions than the claw limiting portion, the claw limiting portion being located axially closer to the inlet end of the insertion hole than the claw release portion,
    when the connector cover is located at a release position where the body portion is detachable from the connection member, the claw release portion is radially aligned with the claw portion, and the claw limiting portion is not radially aligned with the claw portion,
    when the connector cover is located at a lock position, the claw limiting portion is opposite to the claw portions, and the claw portions are engaged with the engagement portion provided on the outer peripheral surface of the connection member, and
    wherein the connector cover is moved from the release position to the lock position by sliding the connector cover in a direction axially away from the connection member,
    wherein the connector cover includes a cylindrical portion that covers a part of the body portion, and the claw release portion comprises a plurality of opening portions, each corresponding to a respective claw portion to receive the respective claw portion.

2. The connector according to claim 1, wherein
    said opening portions comprise through-holes open radially through the cylindrical portion of the connector cover.

3. The connector according to claim 1, wherein
    said opening portions comprise recess portions recessed from an inner peripheral surface of the cylindrical portion of the connector cover outwardly in the radial direction.

4. The connector according to claim 1, wherein
    the body portion includes a plurality of the claw portions arranged in a circumference direction of the insertion hole,
    the connector cover includes a plurality of claw releasing portions provided to correspond to the respective claw portions, and
    the claw limiting portion is a circular portion provided at an end portion of the connector cover, on a side of the connection member in the connection direction.

5. The connector according to claim 1, wherein
    an end portion of the body portion, exposed from the connector cover to the exterior, is positioned on an extension line of the connection direction between the body portion and the connection member.

6. The connector according to claim 5, wherein
    the end portion of the body portion is provided, such that the connection body is pushed to the connection direction when a user applies a force to the end portion of the body portion.

7. The connector according to claim 1, further comprising a fluid conveying connection portion to which the pipe member is connected, the connection portion protruding from a surface of the body portion.

8. The connector according to claim 7, wherein
    the connection portion protrudes in the radial direction from a surface of the body portion.

9. The connector according to claim 7, wherein
    first and second fluid conveying connection portions each protrude from the surface of the body portion.

10. The connector according to claim 9, wherein
    said first and second connection portions protrude in diametrically opposite directions from the body portion.

11. The connector according to claim 1, wherein
    the connector cover includes a bar-shaped knob portion protruding outwardly in the radial direction from the connector cover, the knob portion being disposed to protrude from a portion of the connector cover that is remote from an inlet end of the insertion hole into which the connector member is adapted to be inserted.

12. The connector according to claim 11, wherein first and second bar-shaped knob portions protrude in diametrically opposite directions from the connector cover.

13. The connector according to claim 11, further comprising a fluid conveying connection portion to which the pipe member is connected, the connection portion protruding from a surface of the body portion.

14. The connector according to claim 13, wherein the connection portion protrudes in the radial direction from a surface of the body portion, and the knob portion protrudes in the same radial direction as the connection portion.

* * * * *